(No Model.) 2 Sheets—Sheet 2.
C. B. KIMBALL.
LEATHER BLACKING MACHINE.
No. 589,506. Patented Sept. 7, 1897.
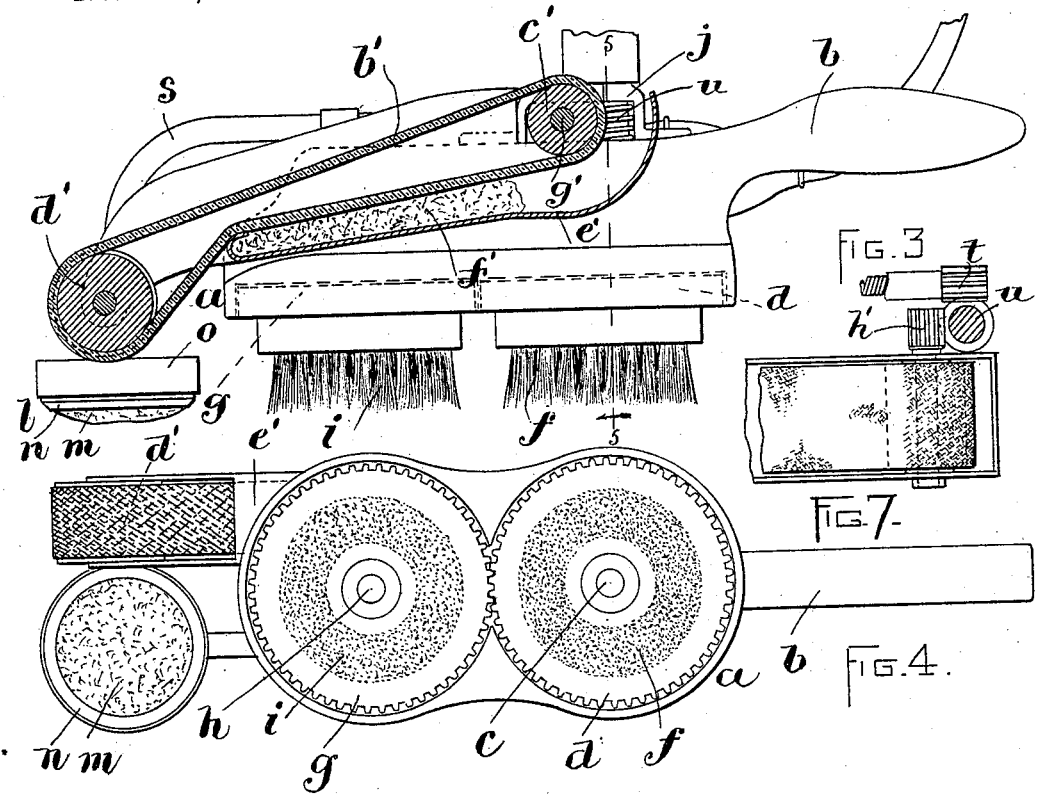
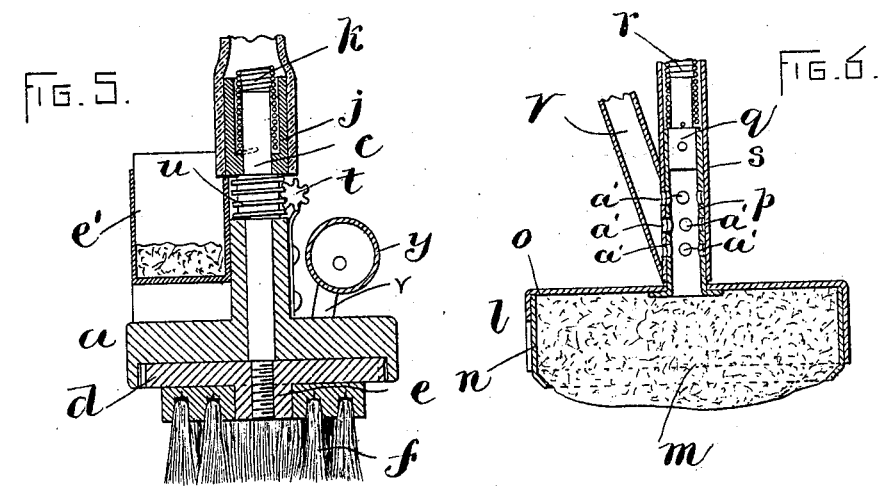
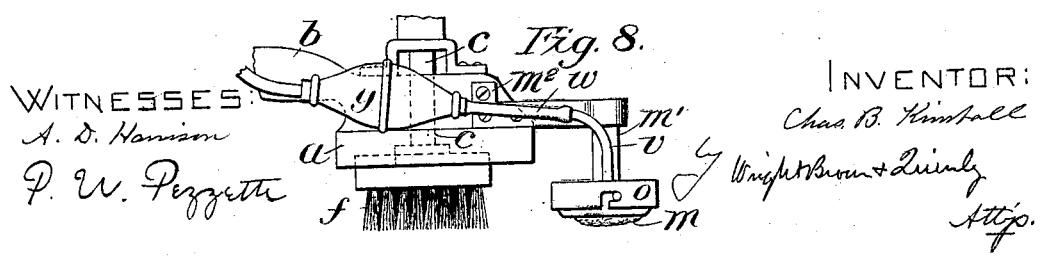
WITNESSES
A. D. Harrison
P. W. Pezzetti
INVENTOR:
Chas. B. Kimball
by Wright Brown & Quimby
Attys.

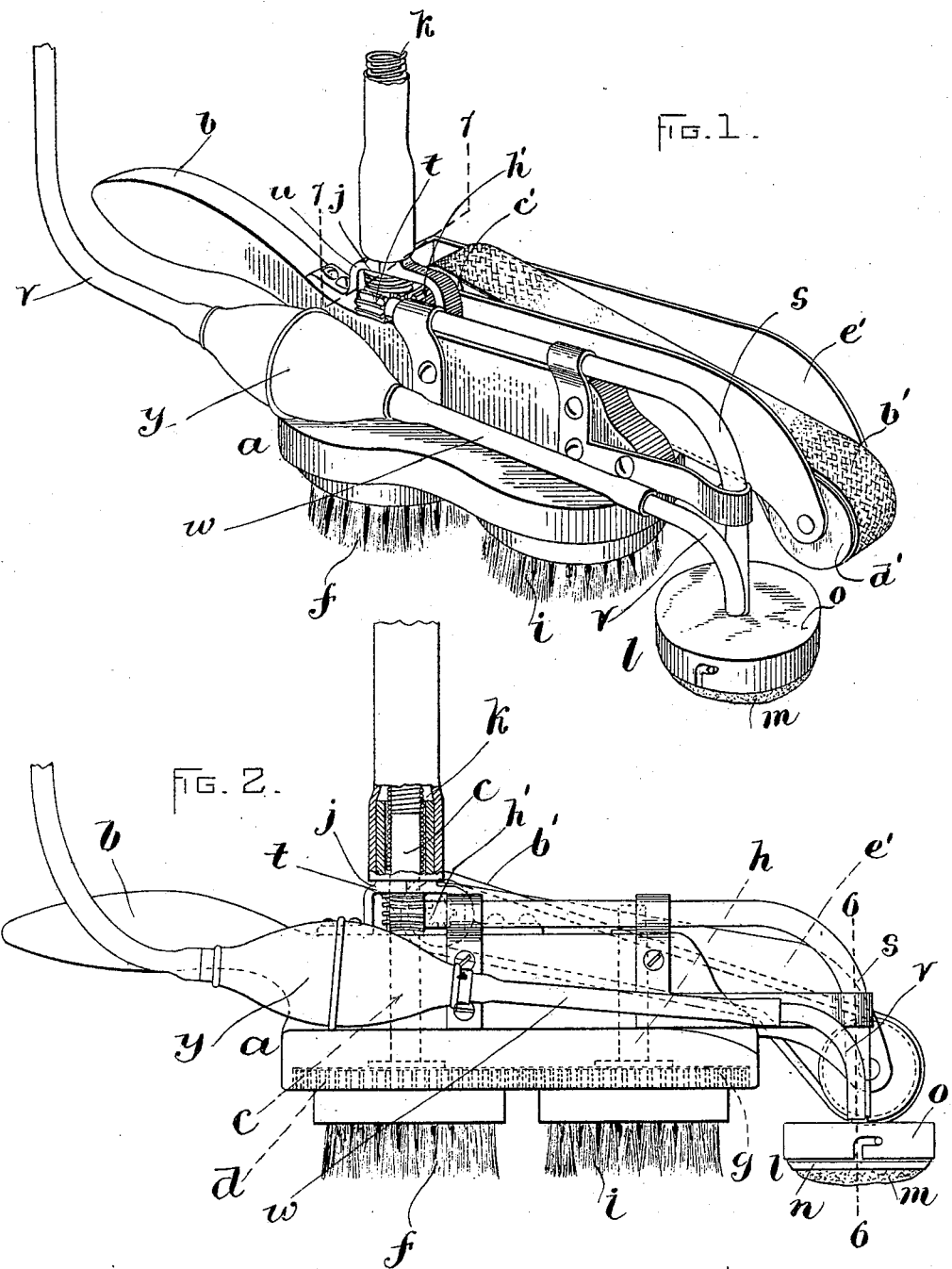

UNITED STATES PATENT OFFICE.

CHARLES B. KIMBALL, OF HAVERHILL, MASSACHUSETTS, ASSIGNOR OF ONE-THIRD TO JAMES H. MURRAY, OF SAME PLACE.

LEATHER-BLACKING MACHINE.

SPECIFICATION forming part of Letters Patent No. 589,506, dated September 7, 1897.

Application filed October 1, 1896. Serial No. 607,590. (No model.)

*To all whom it may concern:*

Be it known that I, CHARLES B. KIMBALL, of Haverhill, in the county of Essex and State of Massachusetts, have invented certain new and useful Improvements in Leather-Blacking Machines, of which the following is a specification.

This invention has for its object to provide an improved machine for rapidly cleaning, applying blacking to, and polishing boots and shoes either in the factory where they are manufactured or elsewhere; and it consists in the improvements which I will now proceed to describe and claim.

Of the drawings accompanying this specification and forming a part thereof, Figure 1 represents a perspective view of a blacking-machine embodying my improvements. Fig. 2 is a side elevation of the same. Fig. 3 is a side elevation looking from the opposite side from that shown in Fig. 2, with a part of the machine shown in section. Fig. 4 is an inverted plan view. Fig. 5 is a section on line 5 5 of Fig. 3. Fig. 6 is an enlarged sectional detail on the line 6 6 of Fig. 2. Fig. 7 is a sectional detail on the line 7 7 of Fig. 1, looking downwardly. Fig. 8 represents a side elevation showing but one polishing-brush and a non-rotating dauber.

The same letters of reference indicate the same parts in all the figures.

In the drawings, $a$ represents a portable base or holder having a handle $b$ and adapted to be moved about by the hand of the operator. Journaled in a bearing on the base $a$ is a spindle $c$, Fig. 5, having upon its lower end a screw-threaded portion, to which is secured a gear $d$, having a hub $e$, to which is suitably secured a brush $f$. The gear $d$ meshes with a gear $g$, which is secured to a spindle $h$, mounted in the supporting-base, as shown in dotted lines in Fig. 2, and is provided with a brush $i$.

The spindle $c$, to which the brush $f$ is attached, is supported at its upper end by a sleeve or bushing $j$, secured to the upper portion of the supporting-base, as in Fig. 1. Rotation is imparted to the spindle $c$ by a flexible shaft $k$, one end of which is secured to the spindle $c$, the other end (not shown) being connected with a suitable motor. The flexible shaft enables the operator to move the machine freely over the work while the brushes are rotating.

$m$ represents a daubing-brush which is used for applying the liquid blacking to the desired parts of a boot or shoe, and may be made of sponge or other suitable material adapted to absorb the liquid. Said brush is secured in a suitable holder $n$, which is detachably secured to a head $o$ by a suitable bayonet-joint construction, as shown in Fig. 2. The head is provided with a hollow stem $p$, the upper end of which is attached to the end piece $q$ of a flexible shaft $r$, said shaft being encased by a tube or hollow bearing $s$, Fig. 5, suitably mounted upon the holder $a$. To the opposite end of the flexible shaft $r$ is secured a worm-gear $t$, meshing with a worm $u$, attached to the flexible spindle $c$, the latter communicating motion to the spindle $c$ and the worm-wheel $u$. Said worm-wheel communicates rotary motion to the gear $t$ and through the latter and the flexible shaft $r$ to the daubing-brush $m$. The daubing-brush is supplied with liquid blacking or coloring liquid through a tube $v$, one end of which is connected to the supporting tube or bearing $s$ and the other end with a flexible rubber pipe $w$, which is provided with a bulb $y$, arranged to be grasped by the operator. By the compression of said bulb the required amount of blacking is forced into the brush $m$ through openings $a'$, provided in the stem $p$ and bearing $s$. The pipe $v$, which conducts the blacking to the brush, is connected at the upper end with a suitable tank or reservoir. (Not shown.) The bulb is or may be of the kind used in atomizers and is provided with suitable valves.

For use in cleaning soiled portions of boots and shoes I have provided the cleaning device next described. Said apparatus consists of a belt $b'$ of absorbent material, such as felt or woolen, arranged upon rollers or drums $c'$ $d'$, journaled in bearings suitably arranged with relation to a trough or tank $e'$, secured to the supporting-base $a$, said trough containing absorbent material $f'$, such as sponge, adapted to hold water in sufficient quantity to keep the felt moistened as required. The pulley $c'$ is mounted upon a shaft $g'$, having upon one end a worm $h'$, meshing with the worm-wheel $u$ upon the spindle $c$, as shown in Fig. 7. The belt $b'$ is therefore kept slowly in motion in contact with the moistened material $f'$ and presents a moist surface to the soiled portions of the work. The holder $n$ may be readily removed from the head by means of the already-described connection and another brush substituted therefor when changing from one color to another.

I do not limit myself to the specific construction here shown and described, as the same may be variously modified without departing from the spirit of my invention.

The means for rotating the daubing-brush may be omitted, said brush being stationary on the holder, as shown in Fig. 8, in which $m'$ represents a non-rotary shank supporting the dauber, said shank being affixed to an arm $m^2$, which is secured to the holder $a$; but one polishing-brush may be employed instead of two, as shown in Fig. 8.

The improved machine may be used for blacking or dressing hides, skins, harnesses, or any other work requiring to be blacked, polished, cleaned, or dressed.

It will be observed that the polishing-brushes and dauber are all located in the same plane, the brushes being at one side of the dauber. This arrangement enables the dauber and brushes to act simultaneously on the article to be blacked and polished, so that the device may be moved progressively over the article, the brushes attacking the blacking in the wake of the dauber. Hence there is no occasion for reversing or changing the position of the device and holding it in one position to daub and in another to polish.

I claim—

1. A machine of the character specified, comprising a portable holder, a daubing device composed of a casing having a tubular perforated stem and brush material secured thereto in position to receive liquid from said stem, a hollow bearing affixed to the holder and inclosing the stem, said bearing having liquid-inlets coinciding with the perforations in the stem, a liquid-supply tube or conduit composed of a rigid section attached to the bearing and a flexible section having liquid-forcing means, one or more polishing-brushes rotatively mounted on the holder, a flexible shaft connected at one end with said holder, and connections between said shaft and the daubing and polishing brushes through which said brushes are simultaneously rotated, said connections including a flexible shaft extending through the said hollow bearing and attached to the stem of the daubing-brush.

2. A machine of the character specified, comprising a portable holder, a cleaning-belt mounted on pulleys supported by said holder, means for moistening the belt, one or more polishing-brushes rotatively mounted on the holder, a flexible shaft connected at one end with the holder, and connections between said shaft, the cleaning-belt, and the polishing-brushes, whereby said belt and brushes are simultaneously impelled.

3. A machine of the character specified, comprising a portable holder, a daubing-brush rotatively mounted thereon, a flexible liquid-supply pipe communicating with said brush, one or more polishing-brushes rotatively mounted on the holder, a flexible shaft connected with the holder, and connections between said shaft and all the brushes, whereby they are simultaneously rotated.

In testimony whereof I have signed my name to this specification, in the presence of two subscribing witnesses, this 22d day of June, A. D. 1896.

CHARLES B. KIMBALL.

Witnesses:
 WINFIELD S. PETERS,
 LE ROY V. ROY.